United States Patent

Hipsky et al.

(10) Patent No.: US 9,796,477 B2
(45) Date of Patent: Oct. 24, 2017

(54) ENGINE DRIVEN-SHAFT DRIVEN COMPRESSOR UTILIZING INFINITELY VARIABLE TRANSMISSION

(71) Applicant: Hamilton Sundstrand Corporation, Windsor Locks, CT (US)

(72) Inventors: Harold W. Hipsky, Willington, CT (US); Gregory L. DeFrancesco, Simsbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 354 days.

(21) Appl. No.: 14/549,213

(22) Filed: Nov. 20, 2014

(65) Prior Publication Data

US 2016/0167790 A1    Jun. 16, 2016

(51) Int. Cl.

| | |
|---|---|
| *F02C 7/36* | (2006.01) |
| *B64D 13/06* | (2006.01) |
| *F02K 3/00* | (2006.01) |
| *F02C 6/08* | (2006.01) |
| *B64D 13/02* | (2006.01) |
| *F02C 7/32* | (2006.01) |

(52) U.S. Cl.
CPC .............. *B64D 13/06* (2013.01); *B64D 13/02* (2013.01); *F02C 6/08* (2013.01); *F02C 7/32* (2013.01); *F02C 7/36* (2013.01); *F02K 3/00* (2013.01); *B64D 2013/0618* (2013.01); *F05D 2260/40* (2013.01); *F05D 2270/03* (2013.01)

(58) Field of Classification Search
CPC ............................... B64D 13/06; B64D 13/02; B64D 2013/0618; F02C 7/32; F02C 7/36; F02C 6/08; F02C 3/113; F02K 3/00; F05D 2260/40; F05D 2270/03

USPC ............................................................ 60/608
See application file for complete search history.

(56) References Cited

U.S. PATENT DOCUMENTS

| | | | |
|---|---|---|---|
| 4,858,493 A * | 8/1989 | Cordner | F16H 3/663 475/127 |
| 5,125,806 A | 6/1992 | Quick et al. | |
| 2013/0133332 A1* | 5/2013 | Macfarlane | F02C 7/36 60/773 |
| 2014/0208760 A1* | 7/2014 | Dubreuil | F02C 7/36 60/772 |
| 2014/0223901 A1 | 8/2014 | Versteyhe et al. | |

FOREIGN PATENT DOCUMENTS

EP    2584172    4/2013

OTHER PUBLICATIONS

International Search Report, International Application No./Patent No. 15195583.8-1607, dated Apr. 1, 2016, European Patent Office, International Search Report 8 pages.

* cited by examiner

*Primary Examiner* — Jonathan Matthias
(74) *Attorney, Agent, or Firm* — Cantor Colburn LLP

(57) ABSTRACT

An air compressing system is provided that includes a compressor configured to compressor air. An engine is operatively connected to the compressor. Further, an infinitely variable transmission is operatively connected between the engine and the compressor. A first shaft operatively connects the engine to the infinitely variable transmission and is configured to rotate at a first speed and a second shaft operatively connects the infinitely variable transmission to the compressor and is configured to rotate at a second speed.

12 Claims, 1 Drawing Sheet

ENGINE DRIVEN-SHAFT DRIVEN COMPRESSOR UTILIZING INFINITELY VARIABLE TRANSMISSION

BACKGROUND OF THE INVENTION

The embodiments herein generally relate to compressors, and more particularly relate to engine driven-shaft driven compressors utilizing infinitely variable transmissions.

Gas turbine engines, such as for aircraft, may include systems to supply cabin air through an environmental control system (ECS). The ECS system often uses bleed air from a high pressure compressor section of an aircraft engine that is routed through a series of pipes and valves to a precooler typically located at an engine/aircraft interface. The air from the precooler is then communicated through an aircraft air cycle machine (ACM) for use in the aircraft cabin as ECS air. Use of bleed air in this manner, however, may affect engine performance efficiency because the air pulled/bled from the engine is not employed in providing thrust for the aircraft and power is diverted from the engine to operate the compressor.

BRIEF DESCRIPTION OF THE INVENTION

According to one embodiment, an air compressing system is provided that includes a compressor configured to compressor air. An engine is operatively connected to the compressor. Further, an infinitely variable transmission is operatively connected between the engine and the compressor. A first shaft operatively connects the engine to the infinitely variable transmission and is configured to rotate at a first speed and a second shaft operatively connects the infinitely variable transmission to the compressor and is configured to rotate at a second speed.

According to another embodiment, a method for operating a compressor is provided. The method includes operating an engine to rotate a first shaft at a first rotational speed, converting the first rotational speed to a second rotational speed with an infinitely variable transmission, driving a second shaft at the second rotational speed with the infinitely variable transmission, and operating an air compressor at the second rotational speed to compress air.

Technical effects of embodiments of the invention include providing an efficient means of driving an environmental control system of an aircraft, employing an infinitely variable transmission.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
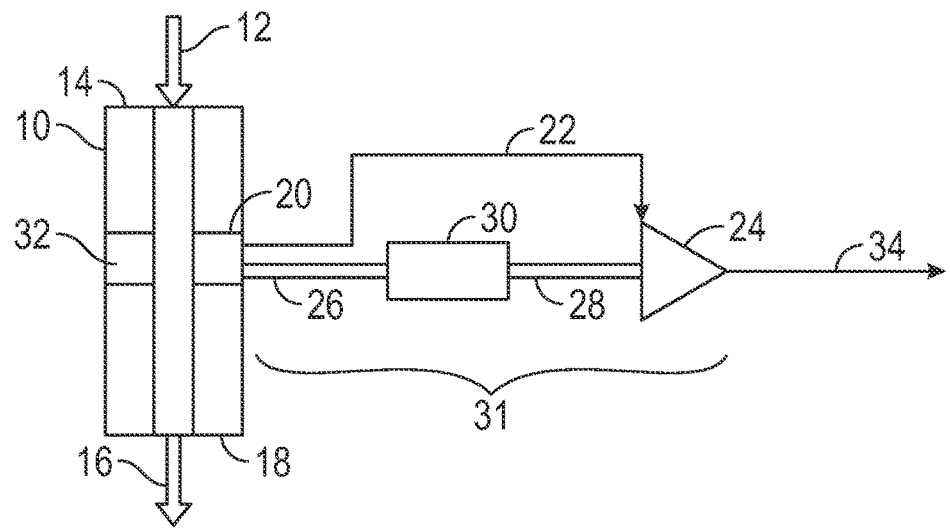
FIG. 1 is a schematic drawing of an aircraft engine and compressor configuration.

Referring to FIG. 1, a schematic diagram of an air compressing system including a transmission in accordance with embodiments of the invention is shown. An engine 10, such as a high bypass gas turbine engine of an aircraft, receives ambient inlet air 12 at an inlet 14 to the engine 10. The air passes through the engine 10 during operation and exits as outlet air 16 at an outlet 18 of the engine 10. As the air passes through the engine 10, a portion of the air is bled off for environmental control system (ECS) applications. A low pressure compressor 20 of the engine 10 is configured to have air extracted or pulled from the engine in the form of bleed air 22 for the ECS applications. The bleed air 22 sourced from the low pressure compressor 20 is compressed, or further compressed, by a compressor 24, such as an ECS compressor, to condition the bleed air 22 to appropriate levels for ECS applications. Those of skill in the art will appreciate that the air supply need not be bleed air, but other sources of air, or combinations of sources may be supplied and compressed without departing from the scope of the invention. For example, in some embodiments the air supplied to the compressor may be one or more of engine fan air, engine bleed air, ambient air, ram-air, or other air source. Compressor 24 is configured to be shaft driven and is operatively connected to the engine 10 by a drive system 31. The drive system 31 includes an engine shaft 26, a compressor shaft 28, and a transmission 30.

The drive system is operatively connected and/or geared to a spool 32 of the engine 10 by engine shaft 26. The spool 32 may be, for example, a low pressure spool of the low pressure compressor 20. The drive system transfers power from the spool 32 to the compressor 24 to operate the compressor 24. The transmission 30 is operatively connected between the engine shaft 26 and the compressor shaft 28. The transmission 30 can be of any type known or will become known. For example, the transmission 30 can be a continuously variable transmission or an infinitely variable transmission. As noted, the transmission 30 is driven by the engine shaft 26 geared to spool 32 of the engine 10. The transmission 30 converts the rotational energy of the engine shaft 26 to drive or rotate the compressor shaft 26, which operatively connects the transmission 30 to the compressor 24, and thus power, operate, or drive the compressor 24.

The speed of the engine shaft 26 varies linearly with the speed of the spool 32. Because spool 32 is part of the engine 10 which provides thrust to an aircraft, the speeds of operation of engine shaft 26 may vary from minimum speeds such as idling, which may be during the descent stage of a flight, to maximum speeds which may occur during takeoff conditions. The transmission 30, which is operatively located between the engine 10 and the compressor 24, is configured to alter the speed of rotation such that the compressor shaft 28 is not rotated at the same speed as the engine shaft 26. For example, the transmission 30 can make the operating speeds substantially inversely proportional to each other, as explained below with respect to FIG. 2. Thus, the transmission 30 allows for control and/or optimization of an ECS shaft driven compressor system. Substantially inversely proportional, as used herein, means that the rotation speeds are close to inversely proportional, or at least that as one increases in the speed, the other decreases in speed—even if not linearly related. However, in accordance with embodiments of the invention, the primary function and operation of some embodiments is that at each operating condition the compressor speed will be adjusted to optimize for environmental control system (ECS) demands.

Transmission 30 permits selective control of the operating speeds of the compressor 24 even at extreme conditions including descent stages of flight and during takeoff conditions. The control provided by incorporating transmission 30 into the drive system allows for increased engine efficiency while providing appropriate power and air pressure for ECS applications.

After the air is compressed at compressor 24, it is passed to components of an ECS along flow line 34. For example, the compressed air can be conveyed to a precooler or other ECS component to further condition the air before it is provided to a cabin or used for other purposes.

Figure 2:
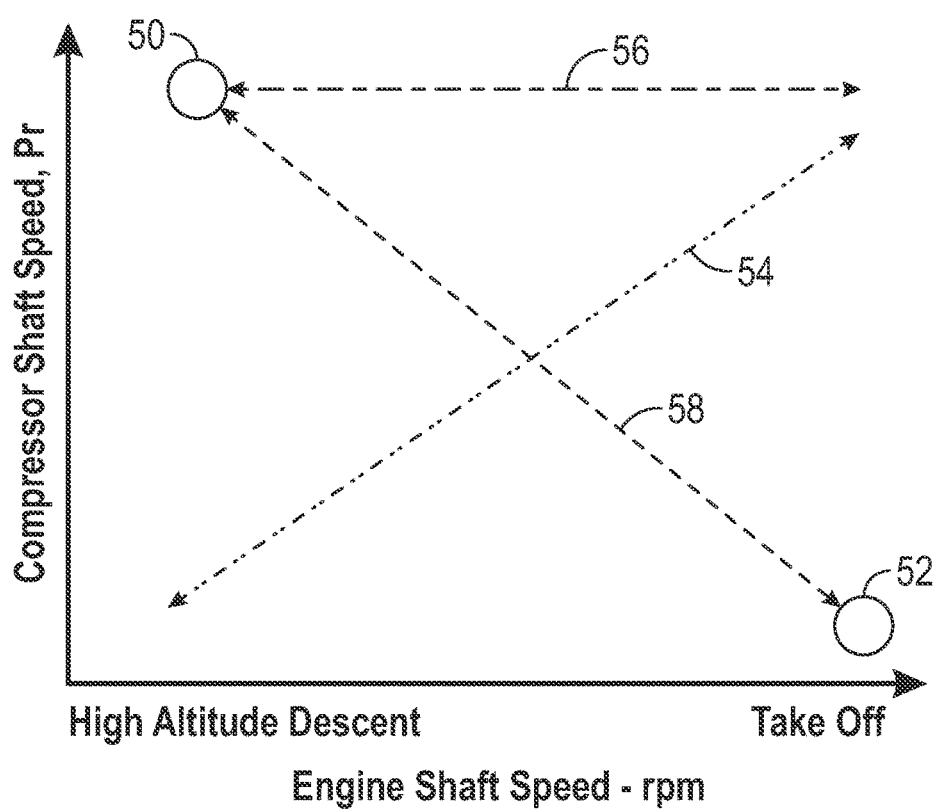
FIG. 2 is a plot depicting the speed relationship between the operating speeds of an engine and the operating speeds of a compressor.

Turning now to FIG. 2, a plot depicting the speed relationship between the operating or rotational speeds of an engine shaft and the operating or rotational speeds of a compressor shaft are shown. In the plot of FIG. 2, the x-axis is the engine shaft speed, in revolutions per minute, and the y-axis is the compressor shaft speed, in revolutions per minute, and in pressure. The y-axis has two legends or units of measure because higher speeds result in high compressor pressure, with the goal of delivering a pressure rise. With reference to FIG. 1, for example, the x-axis represents the rotational speed of the engine shaft 26, as driven by spool 32, and the y-axis represents the rotational speed of the compressor shaft 28 as driven by the transmission 30.

FIG. 2 includes reference points to indicate the relationship between the rotational speeds of the two shafts for ideal operating conditions. The ideal operating condition for low engine shaft speed is a high speed for the compressor. This is represented by point 50. As noted above, low engine speeds occur when the engine idles, for example during high altitude descents. High altitude ambient air is low pressure air that is significantly lower in pressure than the cabin pressure, and therefore needs to be conditioned the most by the ECS compressor. Further, during a high altitude descent, the engine is idled and thus operating at low speeds. These conditions result in low pressure bleed air that is not pre-compressed by the low pressure compressor of the engine prior to passing to the ECS compressor. Thus, the ECS compressor must operate at high speeds to compress the bleed air for ECS applications, such as providing in-cabin air.

In contrast, at the other extreme, during takeoff, the engine is operating at high speeds, and the ideal operation condition is represented by point 52. As point 52 indicates, when the engine is operating at high speeds, there is little need for the ECS compressor to compress bleed air for ECS application. At low altitude, such as when on a runway at the time of takeoff, the ambient air is at a relatively high pressure that is closer to necessary cabin pressures. Further, during takeoff, the engine is operating at maximum speeds, and thus the low pressure compressor of the engine is compressing the air even before it is bled off and supplied to the ECS compressor. As a result, the operating speed of the ECS compressor can be minimized or reduced to zero, as shown by point 52 of FIG. 2.

In view of the above, when the engine is operating at high speeds, the ECS compressor is operated at low speeds or not used at all, and when the engine is operating at low speeds, the ECS compressor is operated at high speeds. As such, the ideal operating relationship between the speed of the engine shaft and the compressor shaft is substantially linearly inverse relationship, as shown in FIG. 2 and represented by points 50 and 52.

Traditional shaft driven compressors are direct driven. The relationship between engine shaft speed and compressor shaft speed for a direct driven compressor is represented as line 54 in FIG. 2. A direct driven compressor provides a proportionally linear relationship, one-to-one, between the engine shaft speed and the compressor shaft speed. This is because the engine shaft and the compressor shaft are the same shaft, i.e., there is only one shaft providing a direct connection between the engine and the ECS compressor, without a transmission there between. Accordingly, low engine speeds result in low compressor speeds, and high engine speeds result in high compressor speeds. This configuration results in operating conditions that are not ideal. For example, when the engine is operating at its maximum speed, the compressor is also operating at its maximum speed, and thus pulling the most energy from the engine. This reduces the energy available to provide thrust to the aircraft, and thus is an energy inefficient mode of operation. Further, when the engine is operating at low speeds, the compressor shaft speed is also low, which either means that the compressor is not compressing the air sufficiently for ECS application or power must be provided from sources other than the shaft, and thus is also energy inefficient.

However, by including a drive system 31, including transmission 30, between the engine and the compressor, as described above with respect to the FIG. 1, the power transfer from the engine to the ECS compressor can be regulated and/or controlled. For example, as represented by line 56 of FIG. 2, the speed relationship between the engine shaft speed and the compressor shaft speed employing a continuously variable transmission is shown. A continuously variable transmission (CVT) is a transmission that can change seamlessly through an infinite number of effective gear ratios between maximum and minimum values. The flexibility of a CVT allows the input shaft to maintain a constant angular velocity.

With reference to FIG. 1, a continuously variable transmission would be located at the position of transmission 30. In this embodiment, the continuously variable transmission converts the engine shaft energy to a fixed speed or constant angular velocity for the compressor shaft. As shown in FIG. 2, the continuously variable transmission permits a more ideal operating relationship, wherein the speed of the compressor is matched to the ideal speed during high altitude descent. However, because the speed of the compressor is constant due to the continuously variable transmission, the speed of the ECS compressor does not match ideal operating conditions for ECS applications during takeoff.

In another embodiment, the ECS compressor is driven by an infinitely variable transmission. In an infinitely variable transmission (IVT), the range of ratios of output shaft speed to input shaft speed includes a zero ratio that can be continuously approached from a defined "higher" ratio. A zero output speed (low gear) with a finite input speed implies an infinite input-to-output speed ratio, which can be continuously approached from a given finite input value with an IVT. Low gears are a reference to low ratios of output speed to input speed. This low ratio is taken to the extreme with IVTs, resulting in a "neutral," or non-driving "low" gear limit, in which the output speed is zero. Unlike neutral in a normal automotive transmission, IVT output rotation may be prevented because the backdriving (reverse IVT operation) ratio may be infinite, resulting in impossibly high backdriving torque; in a ratcheting IVT, however, the output may freely rotate in the forward direction.

In accordance with embodiments of the invention, an IVT is a mechanical and/or electrical transmission device that enables the selection of a given output shaft speed that is independent of the input shaft speed. In some embodiments, the IVT may include an integrated Electronic Management System that enables the engine to communicate with the transmission at a very high rate. Electronic communication and interaction between the engine and the transmission allows optimum productivity and efficiency at any engine speed. This is achieved because the operating conditions may be constantly monitored and relayed to the Electronic Management System, which then automatically determines whether the engine is in a loaded condition (take-off) or a light- to no-load condition (ideal speed during high altitude descent) and makes the appropriate adjustments.

In such embodiments, the Electronic Management System works with the IVT transmission and engine to maintain the selected travel speed at reduced engine rpm when the IVT selector activates the system resulting in increased efficiency and reduced fuel consumption. The Electronic Management System may operate similar to known manual operations. However, because the Electronic Management System is continually communicating with the engine and transmission and making appropriate adjustments based on inputs received from the engine, the IVT system can respond quickly and precisely to changing conditions. This allows maximum efficiency and productivity from the engine. Advantageously, because the changes are automatic, it reduces the reliance on operator experience to make the appropriate manual adjustments.

In embodiments employing an IVT, the speed of the compressor shaft is able to be configured to operate at ideal speeds for all flight conditions. This is shown in FIG. 2 as line 58. As shown, line 58 shows an inverse proportional relationship between engine shaft speed and the compressor shaft speed. As shown, during high altitude descent the ECS compressor operates at high speeds due to the high speed of the compressor shaft. The infinitely variable transmission is able to operate high speeds for the compressor shaft, even with low speeds from the engine shaft during idling of the engine. Further, during takeoff the ECS compressor operates at low speeds, or not at all, even with a high speed engine shaft, thus pulling little to no power from the engine. This results in the most efficient use of power in the system and further provides the ideal operating conditions for the ECS compressor.

In view of the above, an infinitely variable transmission operatively connected between an engine and an ECS compressor permits the most control over the drive speeds of the ECS compressor. Further, by controlling the speeds of the ECS compressor to the ideal conditions, system efficiency may be improved.

Advantageously, utilization of transmissions in accordance with embodiments disclosed herein permit optimization of operating speeds of a shaft driven compressor. Further, such optimization is provided for all flight conditions, including takeoff and high altitude descent stages of flight. This minimizes or eliminates high pressure compressor bleed usage for high bypass engines, and allows for low pressure compressor bleed usage. Further, the optimization provided herein increases the efficiency of engines, such as high bypass engines for aircraft, because engine efficiency is not penalized by extensive high pressure compressor bleed usage for ECS applications.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments or variations thereof. For example, although described herein as employing low pressure compressor bleed air for the air supply, alternative embodiments may employ engine fan air to be utilized for ECS applications. Moreover, although described as one exemplary configuration of an engine and transmission system for compressing air, those skilled in the art will appreciate that other configurations may be employed without departing from the scope of the invention. Accordingly, the invention is not to be seen as limited by the foregoing description, but is only limited by the scope of the appended claims.

What is claimed is:

1. An air compressing system of an aircraft comprising:
an environmental control system compressor configured to compress air to be supplied to a cabin of the aircraft;
a gas turbine engine operatively connected to the compressor, the engine having a low pressure compressor with a low pressure spool;
an infinitely variable transmission operatively connected between the engine and the compressor;
a first shaft operatively connecting the engine to the infinitely variable transmission and configured to rotate at a first speed; and
a second shaft operatively connecting the infinitely variable transmission to the compressor and configured to rotate at a second speed,
wherein as the first speed increases based on an operating condition of the engine the second speed decreases.

2. The air compressing system of claim 1, wherein the infinitely variable transmission is configured such that the first shaft and the second shaft rotate at substantially proportionally inverse speeds.

3. The air compressing system of claim 1, wherein the engine is configured to supply at least one of (i) engine fan air, (ii) engine bleed air, (iii) ambient air, and (iv) ram-air to the compressor for compression.

4. The air compressing system of claim 1, wherein the infinitely variable transmission is configured such that the first shaft and the second shaft rotate at speeds optimized for demands of the environmental control system.

5. The air compressing system of claim 1, wherein the engine comprises a high bypass gas turbine engine.

6. The air compressing system of claim 1, wherein the compressor is configured to operate at at least one of (i) a low speed during take-off and (ii) a high speed during idle descent.

7. An aircraft including the air compressing system of claim 1.

8. A method for operating an environmental control system compressor of an aircraft, the method comprising:
operating a gas turbine engine to rotate a first shaft at a first rotational speed, the engine having a low pressure compressor with a low pressure spool;
converting the first rotational speed to a second rotational speed with an infinitely variable transmission;
driving a second shaft at the second rotational speed with the infinitely variable transmission; and
operating an air compressor at the second rotational speed to compress air,
wherein as the first speed increases based on an operating condition of the engine the second speed decreases.

9. The method of claim 8, wherein the second rotational speed is inversely proportional to the first rotational speed.

10. The method of claim 8, further comprising supplying at least one of (i) engine fan air, (ii) engine bleed air, (iii) ambient air, and (iv) ram-air to the compressor.

11. The method of claim 8, further comprising providing the compressed air to an environmental control system of the aircraft.

12. The method of claim 8, wherein the compressor is operated at at least one of (i) a low speed during take-off and (ii) a high speed during idle descent.

* * * * *